US008819589B2

(12) United States Patent
Bensley et al.

(10) Patent No.: US 8,819,589 B2
(45) Date of Patent: Aug. 26, 2014

(54) PROVIDING PARTNER SERVICES WITHIN A HOST APPLICATION

(75) Inventors: Ann-Mari Bensley, Kirkland, WA (US); Lesley L. Jacobs, Seattle, WA (US); Jason D. Giles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 12/136,077

(22) Filed: Jun. 10, 2008

(65) Prior Publication Data

US 2009/0307303 A1    Dec. 10, 2009

(51) Int. Cl.
*G06F 17/00*    (2006.01)
*G06F 3/0481*    (2013.01)
*G06F 3/048*    (2013.01)

(52) U.S. Cl.
CPC .............. *G06F 3/0481* (2013.01); *G06F 3/048* (2013.01)
USPC .......................................... 715/825; 715/234

(58) Field of Classification Search
USPC ................................................ 715/234, 825
See application file for complete search history.

(56) References Cited

U.S. PATENT DOCUMENTS

| 5,892,909 | A  |   | 4/1999  | Grasso et al. |
|-----------|----|---|---------|---------------|
| 5,978,595 | A  | * | 11/1999 | Tanaka et al. .................... 710/57 |
| 6,957,429 | B1 | * | 10/2005 | Sekijima et al. ............. 718/100 |
| 6,983,479 | B1 |   | 1/2006  | Salas et al. |
| 7,523,401 | B1 | * | 4/2009  | Aldridge ....................... 715/760 |
| 7,941,761 | B2 | * | 5/2011  | Hally et al. ................... 715/779 |
| 2001/0049821 | A1 |   | 12/2001 | Ochi |
| 2002/0049792 | A1 |   | 4/2002  | Wilcox et al. |
| 2002/0072997 | A1 | * | 6/2002  | Colson et al. .................... 705/27 |
| 2002/0099738 | A1 | * | 7/2002  | Grant ............................. 707/513 |
| 2002/0165882 | A1 |   | 11/2002 | Zettel et al. |
| 2003/0014519 | A1 | * | 1/2003  | Bowers et al. ................ 709/225 |
| 2003/0046201 | A1 | * | 3/2003  | Cheyer ............................ 705/35 |
| 2003/0204425 | A1 | * | 10/2003 | Kennedy et al. .................. 705/7 |
| 2004/0172597 | A1 | * | 9/2004  | Canali et al. ................... 715/513 |
| 2004/0230500 | A1 | * | 11/2004 | Imago ............................. 705/27 |
| 2004/0261010 | A1 | * | 12/2004 | Matsuishi .................. 715/501.1 |

(Continued)

FOREIGN PATENT DOCUMENTS

WO            0203254 A1      1/2002

OTHER PUBLICATIONS

Caverlee et al.; "Discovering and Ranking Web Services with BASIL: A Personalized Approach with Biased Focus"; ICSOC'04, Nov. 15-19, 2004, New York, New York, USA; ACM 1-58113-871-7/04/0011; p. 10 pages.*

(Continued)

*Primary Examiner* — Laurie Ries
*Assistant Examiner* — Benjamin Smith
(74) *Attorney, Agent, or Firm* — Louise Bowman; Jim Ross; Micky Minhas

(57) ABSTRACT

While a user interacts with a networked host application such as creating or editing documents, the user is enabled to invoke (or otherwise act on) a partner-selection user interface presentation to explore available partner services for carrying out a desired partner function that is complementary to the host application functionality. The user is further enabled to select one of the partner services listed in the partner-selection user interface presentation, in response which, the host application automatically instructs the partner service to perform the desired partner function complementing the host functions performed by the host application in an integrated and seamless manner.

14 Claims, 8 Drawing Sheets

(56) References Cited

U.S. PATENT DOCUMENTS

| | | | |
|---|---|---|---|
| 2005/0246654 A1* | 11/2005 | Hally et al. | 715/779 |
| 2005/0262449 A1* | 11/2005 | Anderson et al. | 715/779 |
| 2006/0024653 A1 | 2/2006 | Battagin et al. | |
| 2006/0077439 A1* | 4/2006 | Yamamura et al. | 358/1.15 |
| 2006/0165040 A1* | 7/2006 | Rathod et al. | 370/335 |
| 2006/0259239 A1 | 11/2006 | Nouri | |
| 2007/0089053 A1 | 4/2007 | Uhlig et al. | |
| 2008/0034275 A1* | 2/2008 | Edd et al. | 715/200 |
| 2008/0068647 A1* | 3/2008 | Isobe et al. | 358/1.15 |
| 2008/0098030 A1* | 4/2008 | Edd et al. | 707/102 |
| 2008/0104052 A1 | 5/2008 | Ryan et al. | |
| 2008/0172600 A1* | 7/2008 | Bokor | 715/234 |
| 2009/0228490 A1* | 9/2009 | Faenger | 707/10 |

OTHER PUBLICATIONS

Aviv Segev; "Context-Based Matching and Ranking of Web Services for Composition"; www.eng.tau.ac.il/~eran/papers/Segev_Context_Service.pdf; 2001, 14 pages.*

John Gekas; "Web Service Ranking in Service Networks"; Demos and Posters of the 3rd European Semantic Web Conference (ESWC 2006), Budva, Montenegro, Jun. 11-14, 2006; 3 pages.*

Navid Ahmadi; "Flexible Matching and Ranking of Web Service Advertisements"; MW4SOC Workshop Newport Beach, CA, USA; Nov. 26, 2007; 20 pages.*

Bill Camarda, "Integrating Office Documents with Desktop Publishing Systems," excerpted from Chapter 21 of Office 2000 Deployment & Administration, 2000, available at <<http://www.billcamarda.com/integdtx.pdf>>, 29 pages.

Search Report and Written Opinion for PCT/US2009/042648, international filing date May 4, 2009, mailing date Dec. 22, 2009, 11 pages.

"GMC PrintNet—The Preferred Solution for Print Service Providers," GMC Software Technologies, 2008, GMC home page accessible at <<http://www.gmc.net/en/home/>>, Apr. 1, 2008, 2 pages.

"Swing Software," product description, available at <<http://www.swingsoftware.com/products/docpublisher/features.asp>>, Mar. 31, 2008, 3 pages.

"China First Office Action", Mailed Date: Aug. 16, 2012, Application No. 200980131636.7, Filed Date: May 4, 2009, pp. 10.

* cited by examiner

PROVIDING PARTNER SERVICES WITHIN A HOST APPLICATION

BACKGROUND

A user may work on an item using a host application and then decide to take some action with respect to the item that is not supported by the host application. For example, the user may create a product brochure using a host word processing application. The user may then decide to physically produce the brochure in some form that is not supported by the host word processing application and the environment in which in which it operates. For instance, perhaps the user wishes to print the brochure as a high-quality glossy publication. The host application may interact with a group of output devices, such as printers, fax machines, etc. However, the host application, together with its available output devices, may not have adequate resources to handle the user's printing request.

To address this situation, the user may attempt to find a partner service that can process the document item in the desired manner. The user can locate a partner service in the traditional manner, such as by researching available partner services listed in paper-based directories, network-accessible directories, and so forth. The user may also seek the advice of others, such as by talking to colleagues within her office, reading network-accessible customer reviews, and so forth. Upon selecting a partner service, the user may manually contact the partner service and explain the task to be performed. In some cases, the user may be asked to manually provide the partner service with whatever resources it needs to complete the task, such as a document item file. Finally, when the task is finished, the user may be asked to manually pick up the final product. The user may or may not be satisfied with the results; if not, the user may decide to seek out the services of another partner service.

The above process is inefficient and potentially burdensome to the user. Further, this process may provide uneven results, as there is no assurance that the user will select the most appropriate partner service to fulfill the user's processing needs.

SUMMARY

An illustrative approach is described for providing a partner service to a user. The approach entails first providing a network-accessible host application to the user. The user interacts with the host application to perform a host function. At some point in this interaction, the user may invoke (or otherwise act on) a partner-selection user interface presentation to explore available partner services for carrying out a desired partner function. The user then selects one of the partner services listed in the partner-selection user interface presentation. In response to this selection, the host application automatically instructs the partner service to perform the desired partner function. The partner function complements the host function performed by the host application in an integrated and seamless manner.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for allowing a user to select a partner service within the context of the user's interaction with a host application. The approach helps improve the efficiency of finding and utilizing a partner service. More generally, the concepts disclosed herein may address one or more of the challenges or problems previously noted, but are not limited to addressing all or any of these challenges or problems.

This disclosure is organized as follows. Section A describes an illustrative system for integrating a host system with one or more partner systems. Section B describes an illustrative method for allowing a user to select a partner service within the context of the user's interaction with a host application. Section C describes illustrative processing functionality that can be used to implement any aspect of the features described in Sections A and B.

Figure 9:
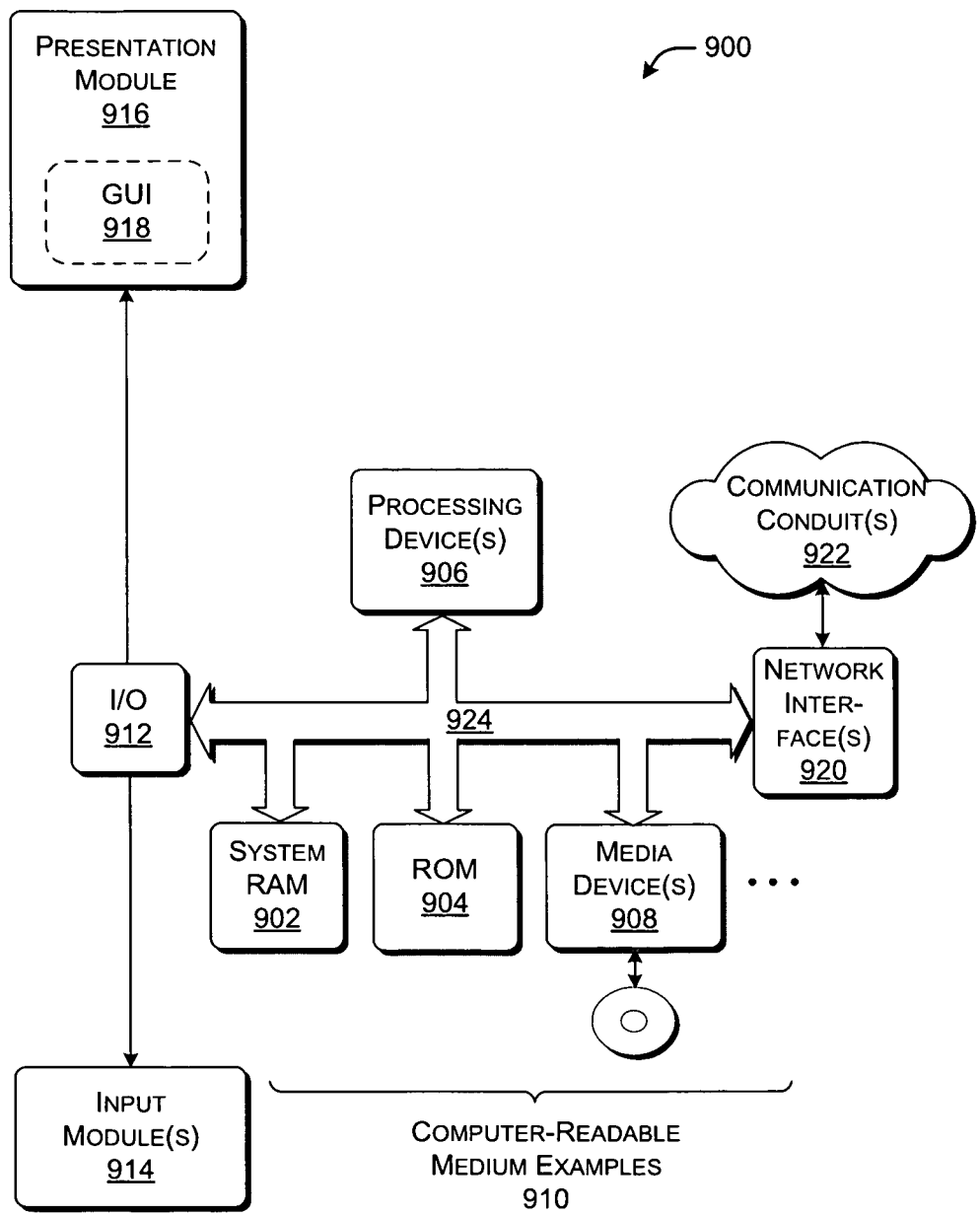
FIG. 9 shows illustrative processing functionality that can be used to implement any aspect of the features shown in the foregoing drawings.

As a preliminary matter, some of the figures describe the concepts in the context of one or more components, variously referred to as functionality, modules, features, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 9, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A. Illustrative Systems

Figure 1:
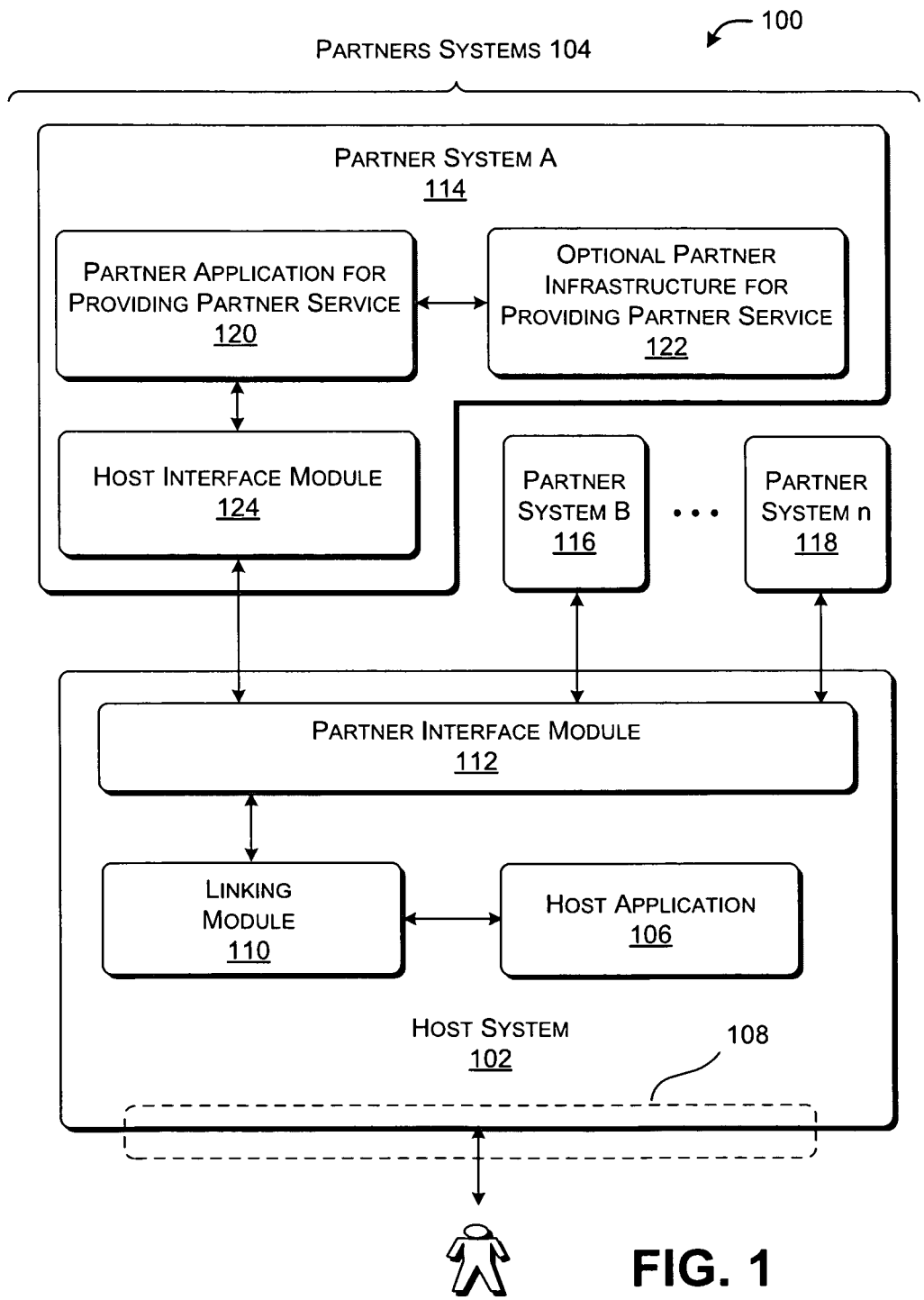
FIG. 1 shows an illustrative system for integrating a host system and one or more partner systems.

FIG. 1 shows one illustrative system 100 for integrating a host system 102 with one or more partner systems 104. In more detail, the host system 102 may include one or more host applications 106 for performing one or more host services (note that the host applications 106 will be referred to in the singular below to facilitate discussion). For example, a host application 106 can allow the user to create and edit document items, such as word processing document items, spreadsheet document items, presentation document items, graphics document items, and so on. The host application 106 can alternatively, or in addition, allow the user to act on other types of items, such as digital photograph items, music file items, and so on. In general, the host service provided by the host application 106 allows the user to perform one or more host functions.

The host application 106 can provide one or more host user interface presentations ("host UI presentations") through which a user can interact with the host application 106. In a network environment (to be described with respect to FIG. 3), frontend server functionality 108 may deliver the host UI presentations through which the user interacts with the host application 106. However, from a general and logical perspective, the host application 106 is described herein as the agent which delivers the host UI presentations. The host application 106 is to be interpreted as corresponding to whatever functionality delivers the host UI presentations, however physically implemented in a particular environment.

The host system 102 also includes a linking module 110. The linking module 110 provides functionality that allows a user to select from among multiple partner services. In one case, the linking module 110 generates a partner-selection user interface presentation ("partner-selection UI presentation"). The partner-selection UI presentation lists one or more partner services. In operation, in the course of performing a host function using the host application 106, the user may decide to perform a partner function. The user invokes (or otherwise acts on) the partner-selection UI presentation and selects an appropriate partner service to perform the desired partner function. The following discussion will provide representative examples of various types of partner services that can be selected.

The host system 102 also includes a partner interface module 112. The partner interface module 112 includes functionality which allows the host system 102 to interact with different partner systems 104. The partner interface module 112 can provide different component modules (not shown) that enable it to interact with respective different types of partner systems 104. By virtue of this provision, the partner interface module 112 can accommodate different communication protocols used by different partner systems 104.

FIG. 1 shows that the partner systems 104 include three representative partner systems (114, 116, 118), but the system 100 can include any number of partner systems. FIG. 1 shows an expanded view of partner system A 114. Other partner systems (e.g., 116, 118, etc.) can have the same composition as partner system A 114 or different compositions.

Partner system A 114 includes a partner application 120 for providing or administering a partner service. In one case, the partner application 120 provides data processing functionality for receiving an instruction to carry out a requested partner function; it responds by carrying out this function. In other cases, the requested partner function may correspond to an activity that cannot be performed solely within the realm of data processing operations. For example, the user may request the partner application 120 to professionally print a document item that she has prepared using the host application 106. In this case, the partner function involves the use of a printing press. In another example, the user may request a team of legal specialists to review a document item. In this case, the partner function is an activity that is performed in a wholly manual manner. In these cases, the partner application 120 corresponds to functionality for receiving the instruction to perform the partner function and for optionally administering the completion of the partner function. The partner application 120 may also serve as a conduit through which the partner system A 114 may communicate its results back to the user via the host application 106.

FIG. 1 shows that partner system A 114 includes optional partner infrastructure 122. The partner infrastructure 122 represents whatever physical equipment is called on to perform the partner function. In one of the scenarios cited above, for example, the partner infrastructure 122 may include a printing press. The partner infrastructure 122 can be construed even more liberally to encompass the facility(ies) in which the partner service takes place.

Finally, FIG. 1 shows that the partner system A 114 can communicate with the host system 102 via a host interface module 124.

In one illustrative implementation, the host system 102 and the partner system A 114 (or any other partner system) are administered by two respective entities. The partner systems 104 themselves can be administered by separate respective entities; alternatively, two or more of the partner systems 104 can be administered by a single entity.

Figure 2:
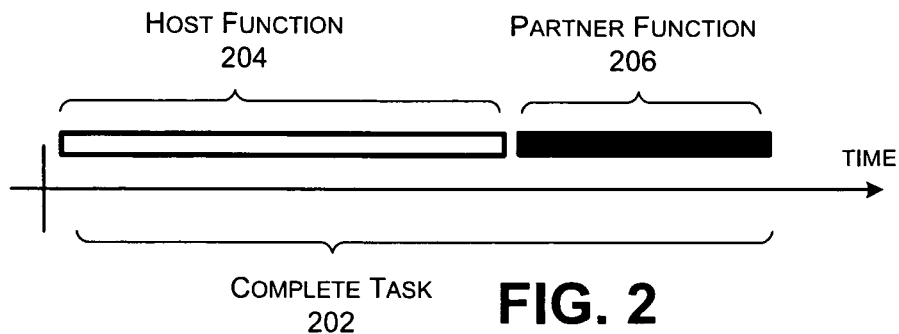
FIG. 2 is a timeline that shows how the system of FIG. 1 can be used to provide a partner function that seamlessly complements a host function.

FIG. 2 is a timeline that shows one illustrative application of the system 100 of FIG. 1. In this case, the user seeks to perform a complete task 202. To perform this task, the user first interacts with the host application 106 to perform a host function 204. Then the user invokes the partner-selection UI presentation to select a partner service. Upon selection, the partner service provides a partner function 206. The partner function 206 complements the host function 204, together accomplishing the complete task 202. FIG. 2 shows that the partner function 206 follows the host function 204. But this is merely one example. In other cases, the partner function 206 may precede the host function 204. Or multiple partner functions can be interleaved within one or more host functions in any manner. No limitation is placed on how the partner function 206 may complement the host function 204.

In one case, the partner service proceeds without any interaction with the user (beyond optionally receiving instructions from the user at the beginning of the partner function 206). In another case, the partner service involves some interaction with the user in the course of performing its partner function 206. The level of interactivity associated with the partner service will depend on the nature of the particular function it performs and other potential factors.

Figure 3:
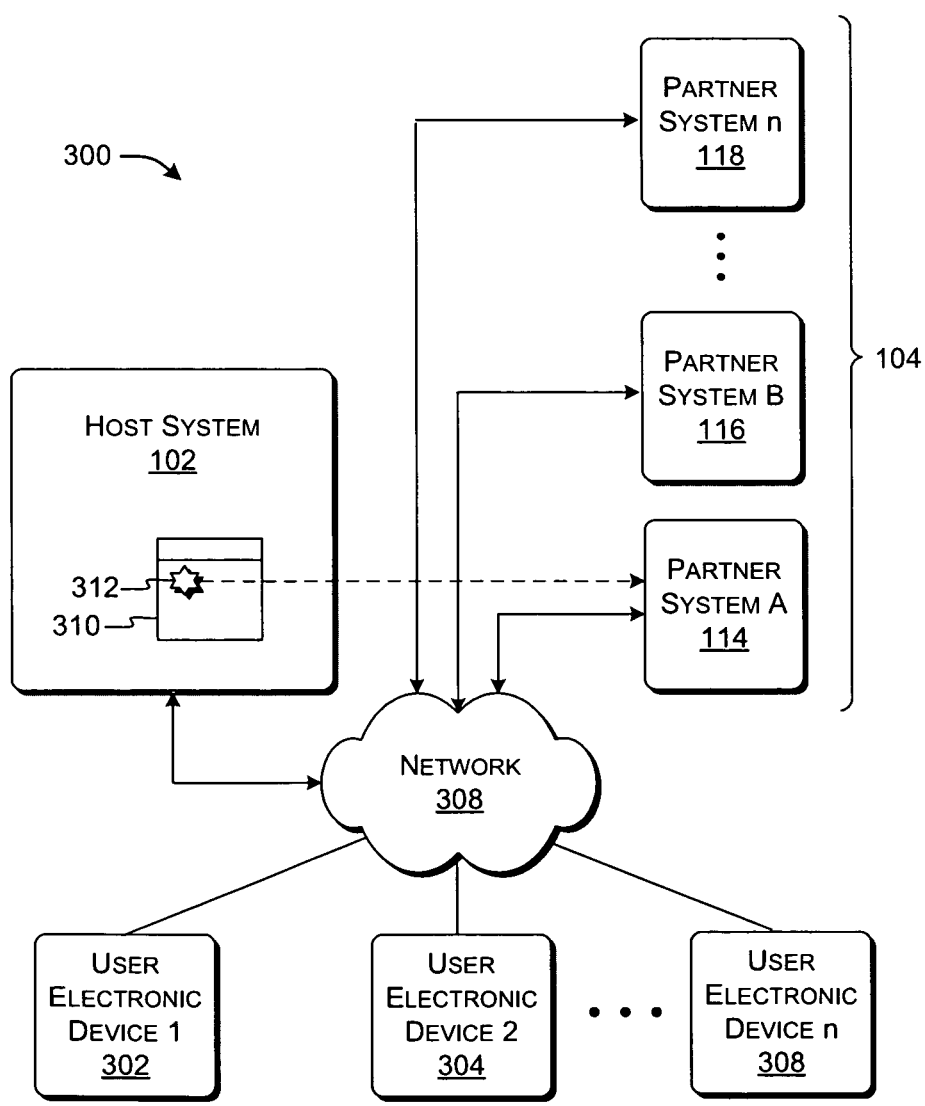
FIG. 3 shows an illustrative network environment for implementing the system of FIG. 1.

FIG. 3 shows a network environment 300 for implementing the system 100 of FIG. 1. In the network environment 300, users may access the host system 102 using respective user electronic devices (302, 304, . . . 306) via a network 308.

The user electronic devices (302, 304, . . . 306) can correspond to any type of data processing device or any combination of types of data processing devices. For instance, a user electronic device can be implemented by a desktop computer, a laptop computer, a personal data assistant (PDA) device, a mobile communication device, a set-top box, a game console device, and so on. Users may access network-accessible resources using browsing functionality (not shown) provided by the user electronic devices (302, 304, . . . 306).

The network 308 may represent any type of mechanism for allowing the user electronic devices (302, 304, . . . 306) to interact with the host system 102. The network 308 can correspond to a wide area network (such as the Internet), a local area network (LAN), a point-to-point connection, or any combination of connectivity mechanisms. The network 308 can be physically implemented using any combination of hardwired links, wireless links, name servers, gateways, routers, and so on (not shown). The network 308 can be governed by any protocol or combination of protocols.

The host system 102 in the context of the network environment 300 functions as a network-implemented service. The host system 102 can be implemented by one or more server-type computers, one or more data stores, and other data processing equipment.

The partner systems 104 may also be coupled to the network 308. At least one of the partner systems 104 may itself represent a network-implemented service. In this case, the partner system can perform its partner function using data processing equipment. At least one other of the partner systems 104 may involve physical operations that lie outside the realm of data processing (such as operating a printing press). As described above, in those circumstances in which the partner function involves such physical operations, the partner system can use data processing equipment for interacting with the host system 102 and for optionally administrating the completion of the requested partner function.

As illustrated in broad overview, FIG. 3 shows that the host system 102 presents a host UI presentation 310 to the user. The user interacts with this host UI presentation 310 to perform a host function. The linking module 110 can present a partner-selection UI presentation 312 in the context of the user's interaction with the host UI presentation 310. The partner-selection UI presentation 312 invites the user to select a partner service to carry out a partner function. Upon selection of a partner service, the host system 102 communicates with a corresponding partner system. FIG. 3 illustrates such communication by the dotted line which connects the host system 102 with representative partner system A 114.

Figure 4:
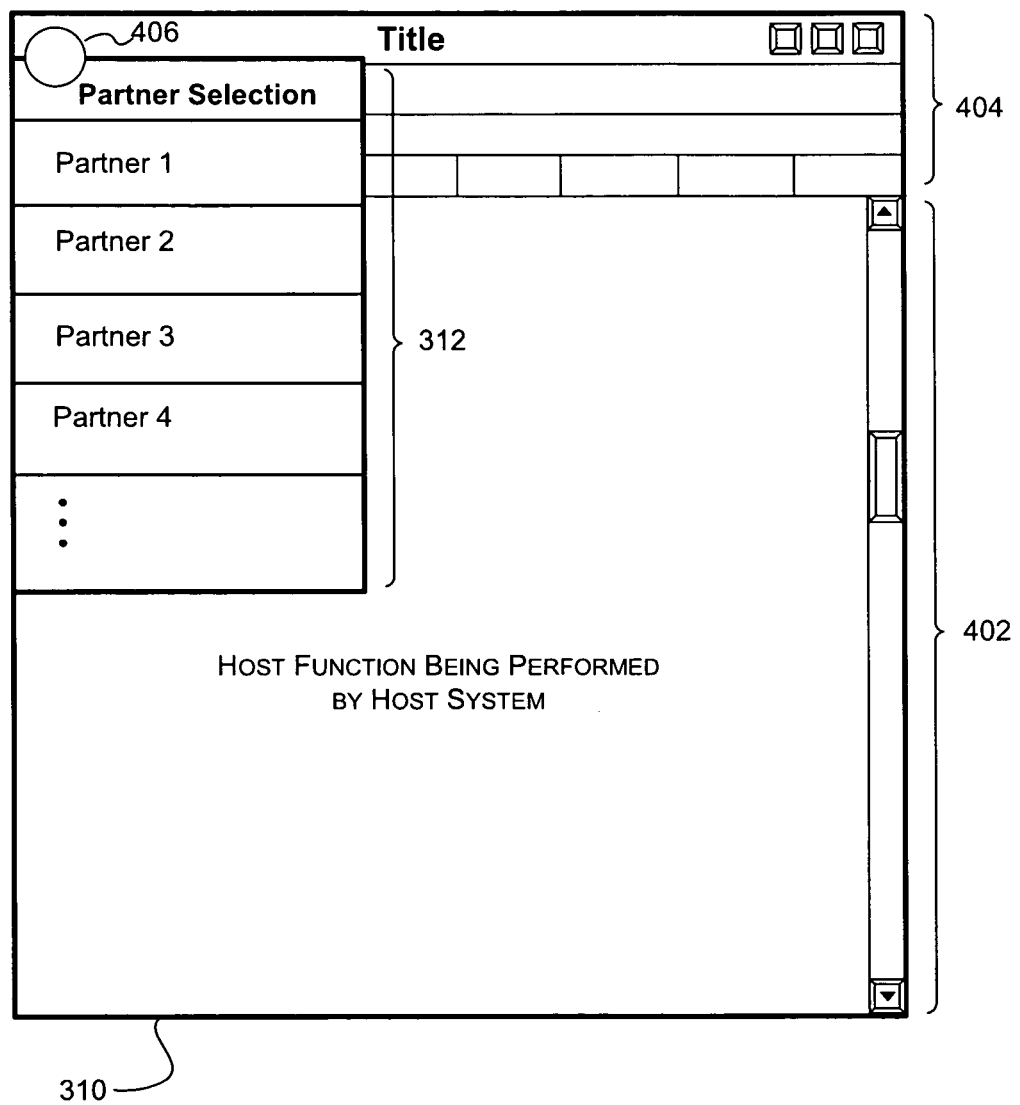
FIG. 4 shows an illustrative partner-selection user interface presentation that can be invoked within the context of a host application; the partner-selection user interface presentation allows a user to select a partner service.

FIG. 4 shows additional details regarding a representative host UI presentation 310 and a representative partner-selection UI presentation 312. In this particular non-limiting scenario, the host UI presentation 310 provides an interface through which the user may create and/or edit any kind of document item, such as a word processing document item, a spreadsheet document item, a graphics document items, and so on.

The host UI presentation 310 can include a work area part 402 in which the user performs one or more host functions. In the case of word processing application, for example, the work area part 402 corresponds to the area in which the user may create and edit a document item. The host UI presentation 310 can also include a control part 404. The control part 404 provides an interface which allows the user to enter various commands. FIG. 4 shows the case in which the control part 404 is displayed at the top of the host UI presentation 310. But other implementations can display the control part 404 in other locations. Further, the host UI presentation 310 can provide plural control parts (not shown).

The control part 404 itself may include various control mechanisms. The control mechanisms can invoke respective functions which are appropriate to the type of service offered by the host application 106. For example, a subset of the control mechanisms may control the opening, saving, closing, printing, etc. of a document item. Another subset of the control mechanisms may control the creation and editing of the document item that is being worked on. The control mechanisms can be implemented as one or more of the following: command buttons, dropdown menus, checkboxes, radio buttons, slider mechanisms, etc.

FIG. 4 shows that the control part 404 includes a main control mechanism 406. Activation of this main control mechanism 406 causes the linking module 110 (of FIG. 1) to present the partner-selection UI presentation 312. This is merely one representative case. Other control mechanisms within the control part 404 can be used to invoke the partner-selection UI presentation 312. In yet another case, the control part 404 can display the partner-selection UI presentation 312 as a persisting part of its control mechanisms, that is, without requiring the user to expressly invoke the partner-selection UI presentation 312. For example, the control part 404 can display the partner-selection UI presentation 312 as a tool bar, a collection of hypertext-type links, or any other control mechanism or combination of control mechanisms. For this reason, the term "partner-selection UI presentation" is to be construed liberally herein; it refers to any collection of user interface information that can be displayed to the user in any form within the context of the host UI presentation 310, with which the user may interact to select a partner service.

In the example of FIG. 4, the partner-selection UI presentation 312 takes the form of a drop-down menu that is presented when the user activates the main control mechanism 406. (Once again, this is merely one option.) The menu presents a list of partner services that can be invoked to perform a desired partner function. The user can select one (or more) of these partner services in any manner, e.g., by clicking on an entry in the partner-selection UI presentation 312. The linking module 110 responds to this selection by sending an appropriate instruction to an associated partner system (e.g., partner system A 114) via the partner interface module 112.

Figure 5:
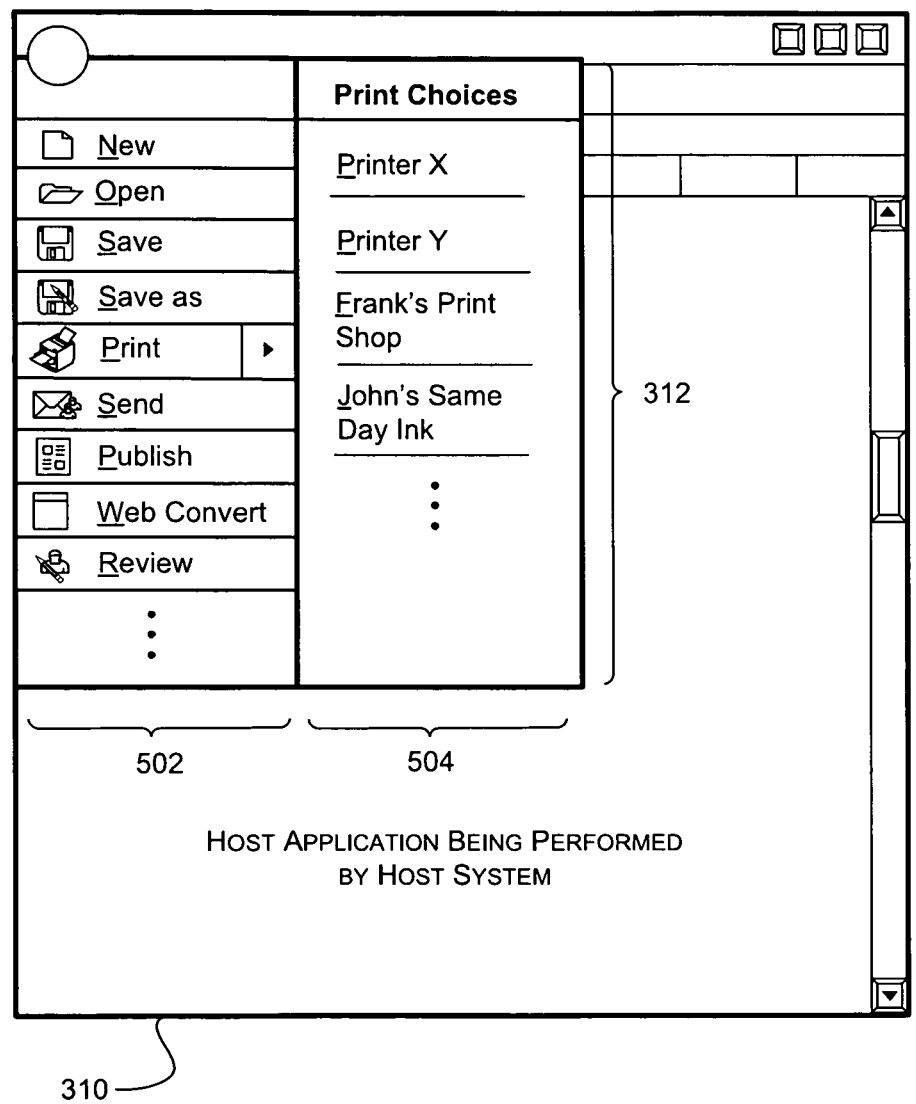
FIGS. 5-7 show other illustrative partner-selection user interface presentations for selecting a partner service.

Advancing to FIG. 5, this figure shows one representative and non-limiting way in which the partner-selection UI presentation 312 can be implemented. This partner-selection UI presentation 312 includes two columns (502, 504) of control options. A first column 502 of options describes various operations that can be performed. In a document item context, illustrative options include "New" (for creating a new document item), "Open" (for opening a new document item"), "Save" (for saving a document item that is being worked on in the work area part 402), and so on. The second column 504 of options identifies a list of services that can be invoked to perform a selected operation in the first column 502. For example, in the illustrated example in FIG. 5, the user has selected a "Print" option in the first column 502. The second column 504 presents a list of services that can be invoked to print a document item.

More specifically, the second column 504 includes a first subset of options that are associated with the home or local environment in which the host system 102 operates. For example, this subset of options can include an option "Printer X" and "Printer Y." Each of these options may direct the host application 106 to print out the document item at a local printer in a traditional manner.

The second column 504 includes a second subset of options that are not associated with the environment in which the host system 102 operates. In other words, these options are associated with respective partner services provided by partner systems. For example, the option "Frank's Print Shop" directs the host system 102 to contact a professional printing business to print an identified document item. This business, for example, may operate a professional printing press. The same applies to the option "John's Same Day Ink." This option is associated with another professional printing business.

Assume that the user activates one of the partner services within the partner-selection UI presentation 312. This prompts the linking module 110 to communicate with the partner system associated with the selected partner service. In one case, the partner service may interact with the user at the outset of the task to determine what functions the user wants to be performed. In another case, the partner service may optionally communicate with the user throughout the process of performing the function.

Figure 6:
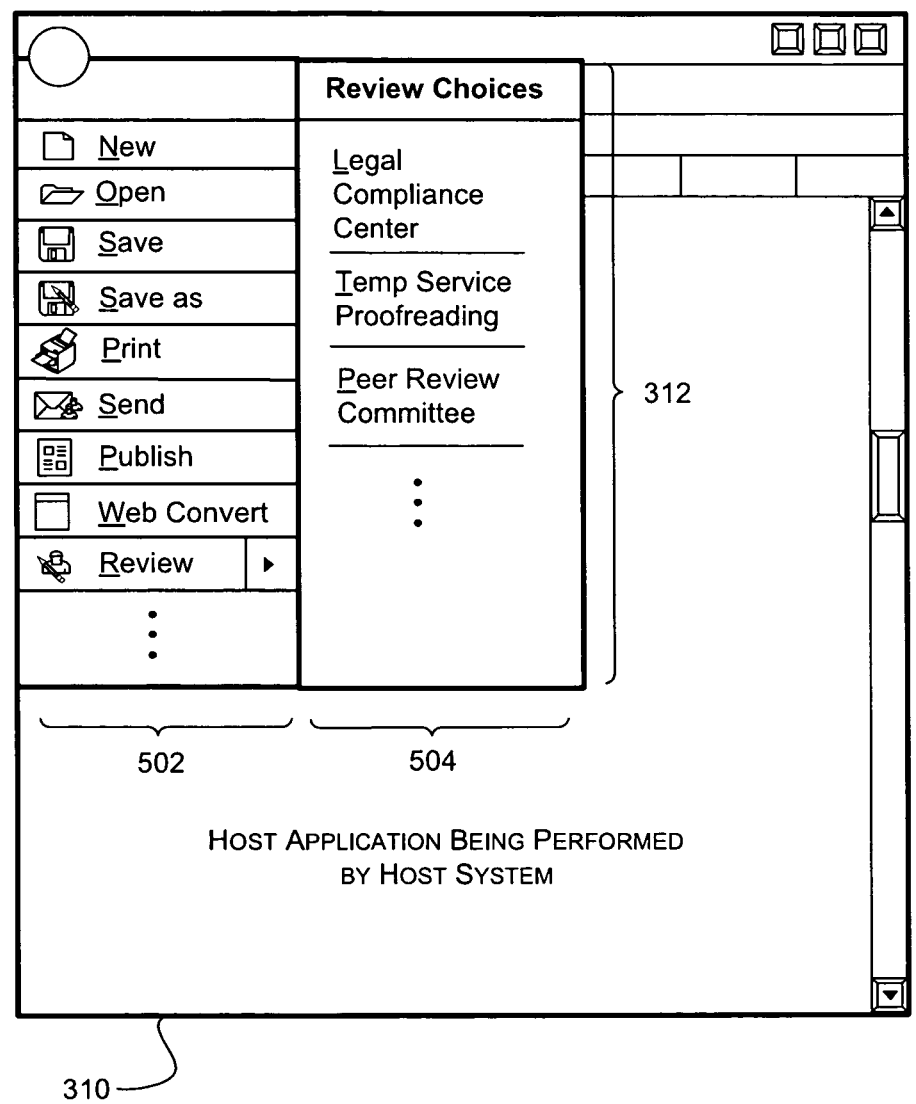

FIG. 6 shows the partner-selection UI presentation 312 for the case in which the user selects another operation in the first column 502, namely "Review." This operation loosely refers to various types of reviews that can be performed on a document item. The second column 504 of options presents partner services that are relevant to this operation. For example, a first option, "Legal Compliance Center," corresponds to a business that will perform legal analysis on a document item (such as by checking a to-be-published book for potential instances of libel). A second option, "Temp Service Proofreading," corresponds to a business that will proofread and format a document item. A third option, "Peer Review Committee," corresponds to an organization that will perform a peer review of information presented in a document item. Still other options are possible for this category of operation ("Review").

Next consider the case in which the user selects the operation "Publish" in the first column 502. This operation pertains to various ways of publishing a document item. Although not shown, the second column 504 in this case can display a list of partner services for publishing a document item. Some of these partner services may correspond network-accessible services for publishing (e.g., posting) document items in electronic form for public access or for more restricted access.

Next consider the case in which the user selects the operation "Web Convert" in the first column 502. This operation corresponds to various ways of converting a document item to a form that allows it to function as a network-accessible page (e.g., a web page). Although not shown, the second column 504 in this case can display a list of different partner services for converting a document item in this manner. For example, such a partner service can convert a document that the user has created in a word processing application into an HTML page (or other type of markup page) that allows it to function as a network-accessible page.

The partner-selection UI presentation 312 can include yet additional operations (in the first column 502) and associated partner service options (in the second column 504). In other words, the above examples are merely representative and not exhaustive of the types of partner services that can be invoked.

Figure 7:
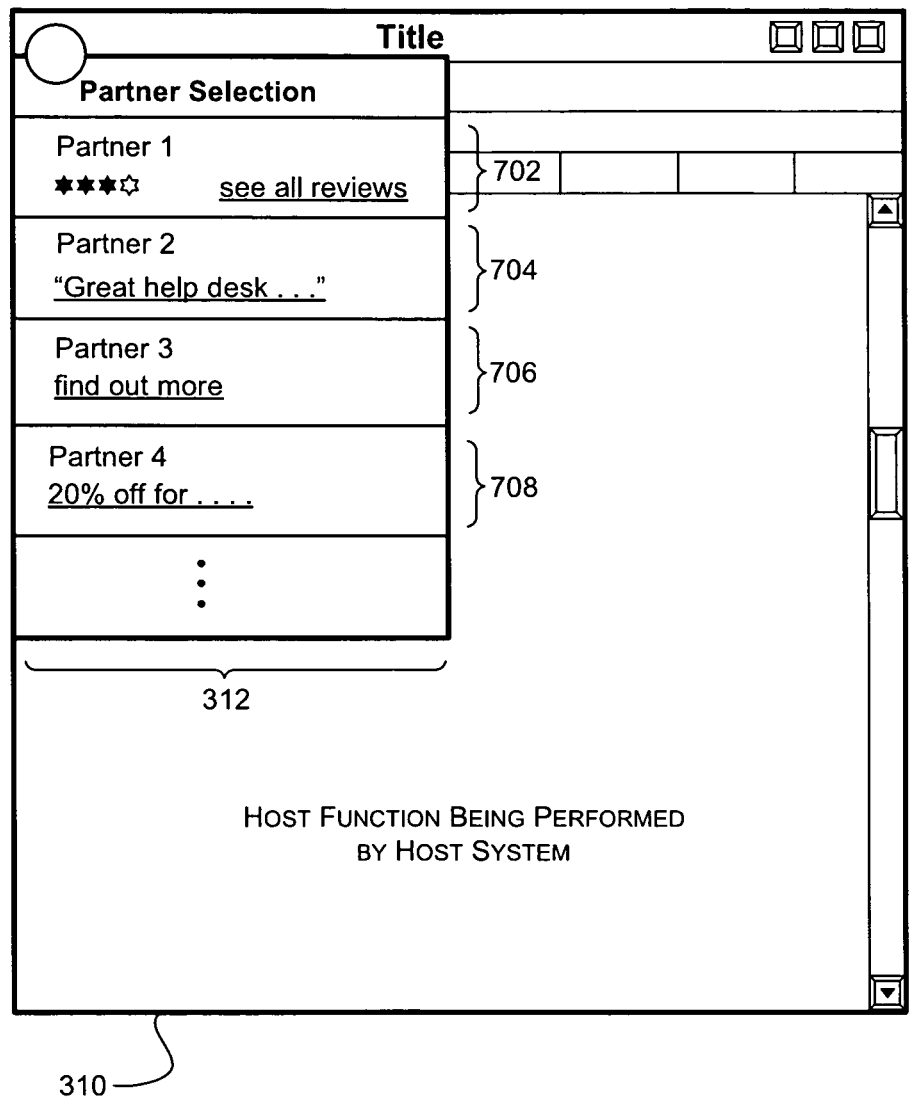

FIG. 7 shows various optional supplemental features that can be added to the partner-selection UI presentation 312. For example, a first entry 702 for partner 1 includes rating information associated with this partner's service. The rating information can be expressed using a star-rating system or some other system. The rating information can provide a rating score given to the partner service by a group of customers. For example, the rating score may be computed by taking the average of the customers' individual rating scores. Or the rating information can reflect the opinion of a particular authorized reviewer, e.g., an expert.

A second entry 704 presents a sample customer comment regarding the service provided by partner 2. The user can activate this sample comment (which can be provided as a hypertext link) and read the customer's full review, as well as the reviews of other people.

A third entry 706 may include a command that can be activated by a user to find out more information regarding the service provided by partner 3. Activation of this command may direct the user to an information page provided by partner 3.

A fourth entry 708 may include information regarding a marketing offer being made by partner 4 (or some other entity). The user may activate this command to find out more about the offer. Or the user may activate the command to accept the offer.

The above list of optional supplemental features that can be added to the partner-selection UI presentation 312 is not exhaustive. Other implementations can include additional supplemental features.

As a final topic in this section, different techniques can be used to populate the information presented by the partner-selection UI presentation 312. Representative scenarios are set forth below:

- In one case, the designer of the host application 106 can select the partner services that will appear in the partner-selection UI presentation 312.
- In addition, or alternatively, the linking module 110 can regularly update its selection of partner services depending on various factors. For example, the linking module 110 can rank the partner services based on their performance, potentially removing partner services that are unpopular or that consistently receive negative reviews.
- In addition, or alternatively, the linking module 110 can dynamically select partner services based on its assessment of the host function that the user is performing. For example, the linking module 110 can discover that the user is in the process of creating a business card (e.g., based on the user's express selection of a card selection tool, or the user's request to create a document item having a size which conforms to a business card). In some cases, the linking module 110 can determine the host function that is being performed based on one or more telltale keywords in the document that the user is creating or editing. In response to such analysis, the linking module 110 can present a collection of partner services which is particularly tailored to the task that the user is assumed to be performing.
- In addition, or alternatively, the linking module 110 can dynamically select partner services based on its assessment of patterns in a particular user's behavior. For example, if the user frequently selects a particular service, the linking module 110 can display an identifier for this service at the top of the list of available services.
- In addition, or alternatively, the linking module 110 can select partner functions based on any type of marketing program. For example, the host system 102 can allow partner services to bid on the right to list their partner services within the partner-selection UI presentation 312. The linking module 110 can dynamically display the partner services corresponding to the top n bidders.
- In addition, or alternatively, the linking module 110 can determine the geographic location in which the user is interacting with the host application 106. In one case, the linking module 110 can make this determination based on information supplied to it by the user in advance. In response, the linking module 110 can provide a list of services which are deemed appropriate for the user's locale. For example, the linking module 110 can identify partner services that are within driving distance of the user's present locale.

In addition, or alternatively, the host application 106 may allow the user to expressly select a custom list of partner services.

B. Illustrative Processes

Figure 8:
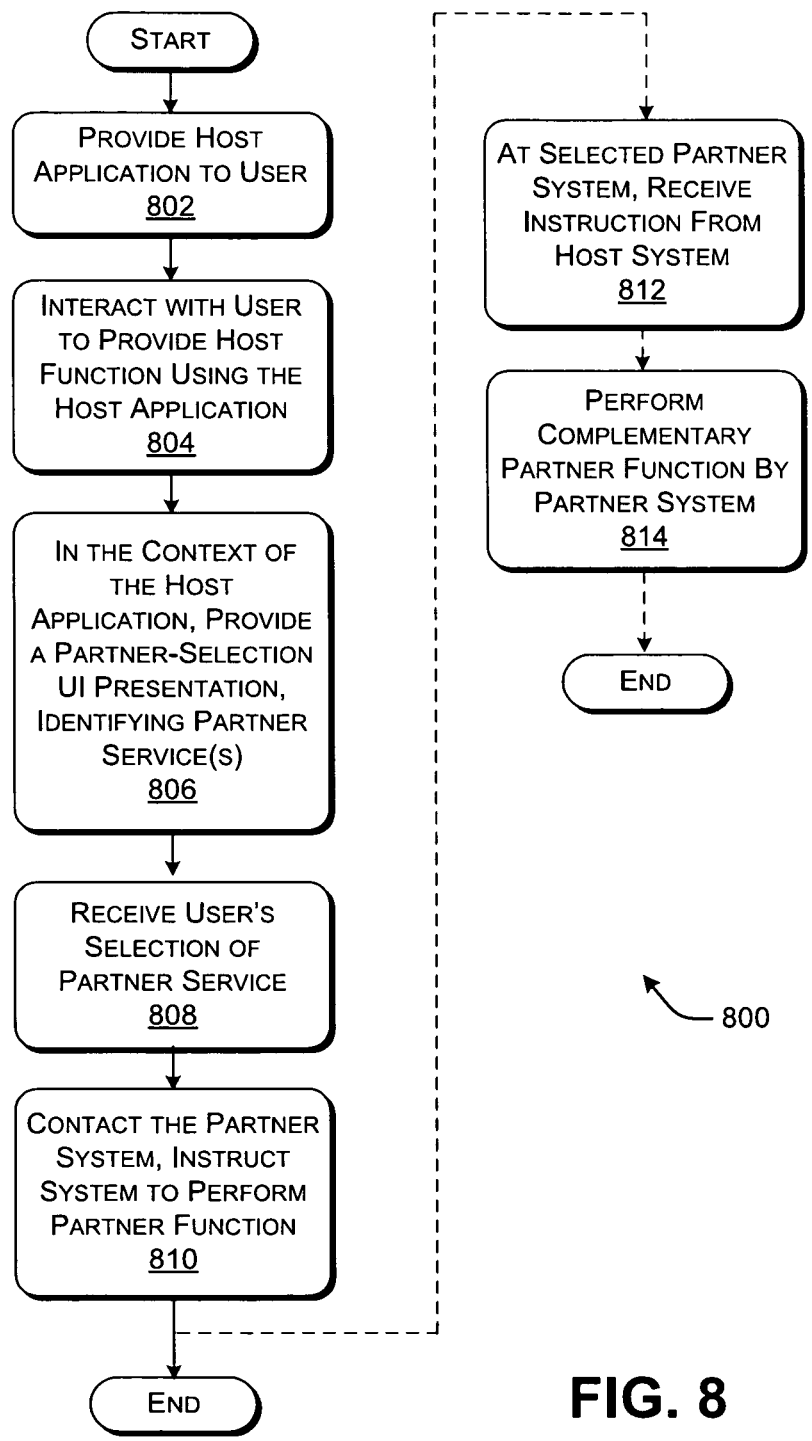
FIG. 8 shows an illustrative procedure for invoking a partner service within the context of the user's interaction with a host application.

FIG. 8 shows an illustrative procedure 800 for performing a task using a combination of the host system 102 and a partner system.

In block 802, the host system 102 presents the host application 106 to the user, e.g., via one or more host UI presentations 310.

In block 804, the host system 102 interacts with the user, allowing the user to execute a host function.

In block 806, the host system 102 provides the partner-selection UI presentation 312. The host system 102 can present the partner-selection UI presentation 312 in response to the user's express activation of this presentation. Alternatively, the control part 404 of the host UI presentation 310 may display the partner-selection UI presentation 312 without asking the user to activate it.

In block 808, the host system 102 receives the user's selection of a partner service. In one case, the user may make this selection by clicking on a desired partner service within a list of available partner services.

In block 810, the host system 102 contacts the partner system associated with the selected partner service, instructing the partner system to perform the identified partner function.

In block 812, the partner system receives the instructions sent by the host system 102.

In block 814, the partner system carries out the instructions, hence performing the requested partner function.

C. Representative Processing Functionality

FIG. 9 sets forth illustrative electrical data processing functionality or equipment 900 (simply "processing functionality" below) that can be used to implement any aspect of the functions described above. With reference to FIG. 3, for instance, the type of equipment shown in FIG. 9 can be used to implement any aspect of the host system 102, any aspect of the partner systems 104, any aspect of the user electronic devices (302, 304, 306), etc. The processing functionality 900 may correspond to a general purpose computing device, a special purpose computing device, or any other implementation.

The processing functionality 900 can include volatile and non-volatile memory, such as RAM 902 and ROM 904, as well as one or more processing devices 906. The processing functionality 900 also optionally includes various media devices 908, such as a hard disk module, an optical disk module, and so forth. The processing functionality 900 can perform various operations identified above when the processing device(s) 906 executes instructions that are maintained by memory (e.g., RAM 902, ROM 904, or elsewhere). More generally, instructions and other information can be stored on any computer-readable medium 910, including, but not limited to, static memory storage devices, magnetic storage devices, optical storage devices, and so on. The term "computer-readable medium" also encompasses plural storage devices. The term "logic" describes instructions for performing identified tasks; for example, the term "linking logic" refers to operations performed by the linking module 110 of FIG. 1.

The processing functionality 900 also includes an input/output module 912 for receiving various inputs from a user (via input modules 914), and for providing various outputs to the user (via output modules). One particular output mechanism may include a presentation module 916 and an associated graphical user interface (GUI) 918. The processing functionality 900 can also include one or more network interfaces 920 for exchanging data with other devices via one or more communication conduits 922. One or more communication buses 924 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a service, the method being performed on electrical data processing equipment, comprising:
    providing a host application executed on a server to a user, the host application provided by a network-accessible host system, the host application having a host user interface presentation that includes a control part and an item work area part, the item work area enabling the user to create and edit items;
    interacting with the user through a user electronic device to perform a host function using the host application;
    the control part of the host application providing a partner-selection user interface presentation as a persisting part of a control mechanism of the control part without requiring the user to invoke the partner-selection user interface presentation within a context of the host function being performed by the host system, the partner-selection user interface presentation identifying a plurality of operations and, for each operation, one or more partner services that can be called upon to perform the operation, the partner services selected among a plurality of partner services executed on another server based on one or more of: a ranking, an assessment of a performed host function, an assessment of user behavior, a marketing program, and a geographic location of the user, the partner service being implemented by a partner system, the partner service providing a partner function which is not provided by the host application and complements the host function provided by the host application;
    receiving a selection from the user of a partner service that is identified among the one or more partner services in the partner-selection user interface presentation; and
    in response to receiving the user's selection, contacting, by the host system, the partner system, instructing the partner system to perform the partner function, wherein a level of user interactivity associated with the partner system depends on the function performed by the partner system.

2. The method of claim 1, wherein the host system and the partner system are administered by two respective entities.

3. The method of claim 1, wherein the host function performed by the host application comprises electronically creating a document item.

4. The method of claim 3, wherein the partner function comprises a function for professionally printing the document item.

5. The method of claim 3, wherein the partner function comprises a function for converting the document item into a specified format.

6. The method of claim 5, wherein the specified format is a markup language format that enables the document item to function as a network-accessible page.

7. The method of claim 3, wherein the partner function comprises a function in which a manual action is performed on the document item.

8. The method of claim 7, wherein the manual action that is performed is legal analysis.

9. The method of claim 1, wherein one operation in the partner-selection user interface presentation is a print operation.

10. The method of claim 1, wherein one operation in the partner-selection user interface presentation is a publish operation.

11. A network-accessible server providing a host system, comprising:
a memory; and
a processing device coupled to the memory, the processing device executing:
a host application configured to provide a host service to a user, the host application having a host user interface presentation that includes a control part and an item work area part, the item work area enabling the user to interact with the host application through a user electronic device and to create and edit items;
a linking module configured to provide a partner-selection user interface presentation within a context of a host function being performed by the host system, the partner-selection user interface presentation identifying a plurality of operations and, for each operation, one or more partner services that can be called upon to perform the operation, the partner services selected among a plurality of partner services executed on another server based on one or more of: a ranking, an assessment of a performed host function, an assessment of user behavior, a marketing program, and a geographic location of the user, the partner service being implemented by a partner system, the partner service providing a partner function which is not provided by the host application and complements the host function that the user is performing using the host application;
the control part of the host application configured to display the partner-selection user interface presentation as a persisting part of a control mechanism of the control part without requiring the user to invoke the partner-selection user interface presentation; and
a partner interface module configured to couple the host system with the partner system, allowing the host system to contact the partner system upon a selection from the user of the partner service in the partner-selection user interface presentation, the host system instructing the partner system to perform the partner function wherein a level of user interactivity associated with the partner system depends on the function performed by the partner system.

12. The server of claim 11, wherein the host function performed by the host application comprises electronically creating a document item.

13. The server of claim 12, wherein the partner function comprises a function for performing some action on the document item that the host application itself does not provide.

14. A server providing a host system, comprising:
a memory; and
a processing device coupled to the memory, the processing device executing:
a host application logic configured to provide:
a host application executed on the server to a user, the host application enabling the user to interact with the host application through a user electronic device and to create and edit items; and
a host user interface presentation that includes a control part and an item work area part, wherein the control part includes a control mechanism for invoking the partner-selection user interface presentation;
a linking logic executed on the server configured to provide a partner-selection user interface presentation to the user in a context of a host function being performed by the host application logic, the partner-selection user interface presentation identifying a plurality of operations and, for each operation, one or more partner services that can be called upon to perform the operation, the partner services selected among a plurality of partner services executed on one or more other servers based on one or more of: a ranking, an assessment of a performed host function, an assessment of user behavior, a marketing program, and a geographic location of the user, the partner service being implemented by a partner system, each partner service providing a partner function which is not provided by the host application and complements the host function that the user is performing using the host application logic, wherein the partner-selection user interface further presents at least one from a set of: a rating score, a sample customer comment, a command for providing additional information, and a marketing offer associated with each partner service;
the control part of the host application configured to display the partner-selection user interface presentation as a persisting part of a control mechanism of the control part without requiring the user to invoke the partner-selection user interface presentation; and
a partner interface logic executed on the server configured to couple the host system with each partner system, allowing the host system to contact any partner system upon a selection from the user of a corresponding partner service in the partner-selection user interface presentation, wherein the partner function performed by one or more of the partner systems precedes the host function wherein a level of user interactivity associated with the partner system depends on the function performed by the partner system.

* * * * *